(12) United States Patent
Carmack et al.

(10) Patent No.: US 6,899,131 B1
(45) Date of Patent: May 31, 2005

(54) BREAKAWAY HOSE COUPLING WITH MANUAL ROTATIONAL SEPARATION

(75) Inventors: Cameron D. Carmack, Dayton, OH (US); David L. Imler, Tipp City, OH (US)

(73) Assignee: Catlow, Inc., Tipp City, OH (US)

( * ) Notice: Subject to any disclaimer, the term of this patent is extended or adjusted under 35 U.S.C. 154(b) by 0 days.

(21) Appl. No.: 10/853,876

(22) Filed: May 26, 2004

(51) Int. Cl.[7] .................................. F16L 37/28
(52) U.S. Cl. .................. 137/614.04; 137/614
(58) Field of Search ............ 137/614.04, 614.05, 137/614.03, 68.14; 285/1

(56) References Cited

U.S. PATENT DOCUMENTS

| | | |
|---|---|---|
| 4,655,462 A | 4/1987 | Balsells |
| 4,691,941 A | 9/1987 | Rabushka et al. |
| 4,905,733 A * | 3/1990 | Carow ............... 137/614.04 |
| 5,433,247 A | 7/1995 | Guertin |
| 6,182,695 B1 | 2/2001 | Coates, III et al. |
| 6,283,151 B1 * | 9/2001 | Countryman et al. .. 137/614.04 |

* cited by examiner

*Primary Examiner*—Kevin Lee
(74) *Attorney, Agent, or Firm*—Jacox, Meckstroth & Jenkins

(57) ABSTRACT

A breakaway coupling for a fuel supply hose includes a male tubular valve body interfitting with or female tubular valve body and defining a fuel supply passage, and the valve bodies enclose axially moveable spring biased valve members. The valve bodies are connected by releasable connecting means which provide for moving the valve bodies from a connected position to a disconnected position in response to a substantial axial tension force on the valve bodies. The valve bodies have cooperating peripherally extending and opposing cam surfaces effective to move the valve bodies from the connected position to the disconnected position in response to relative rotation of the valve bodies and cam surfaces.

19 Claims, 3 Drawing Sheets

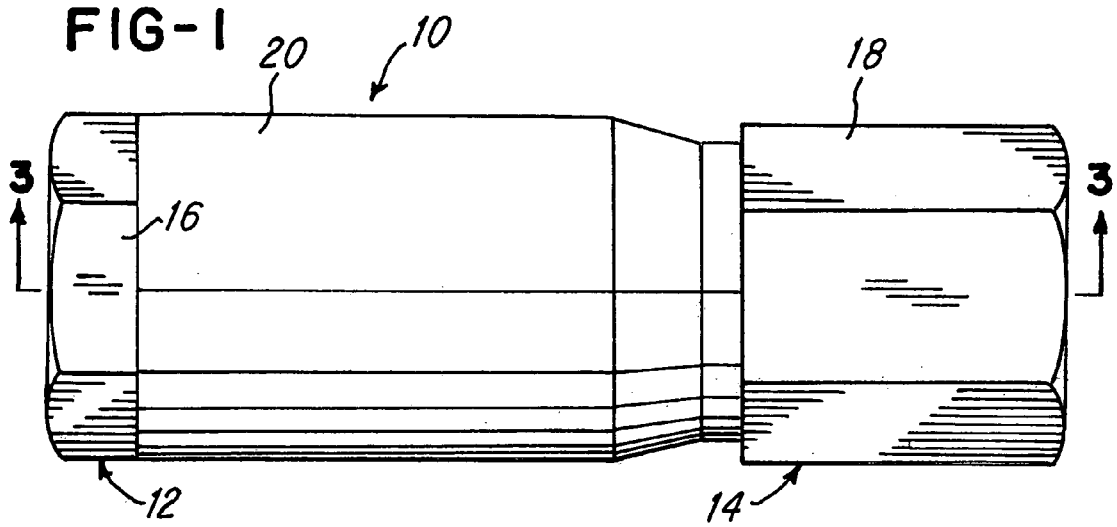
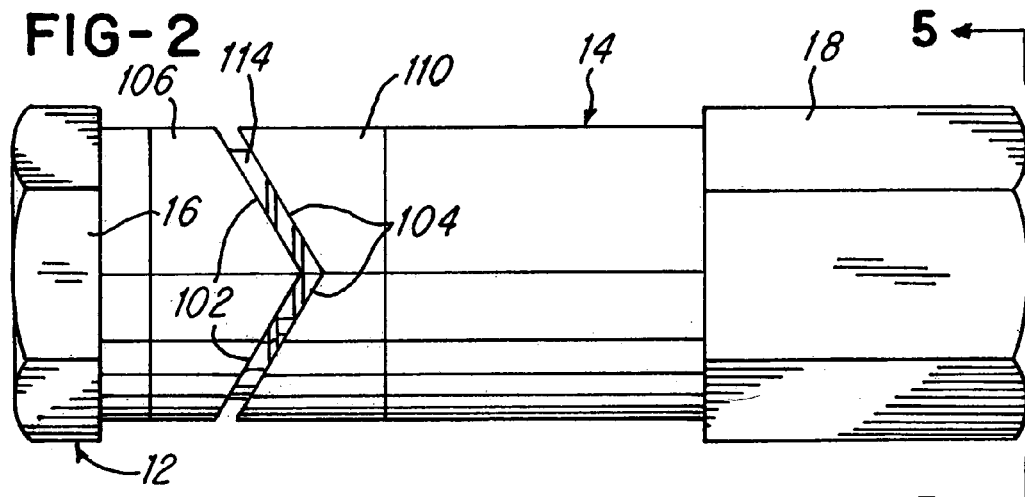
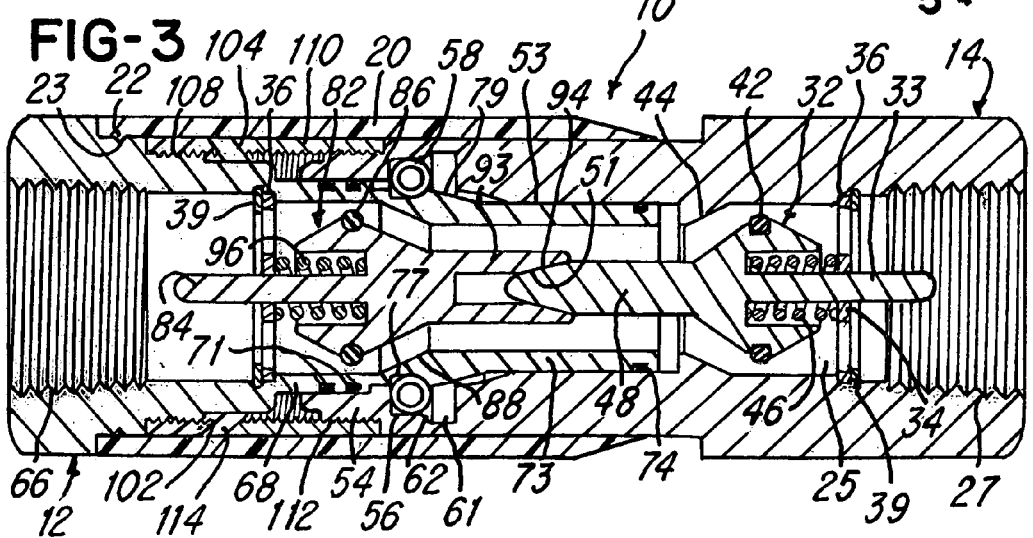

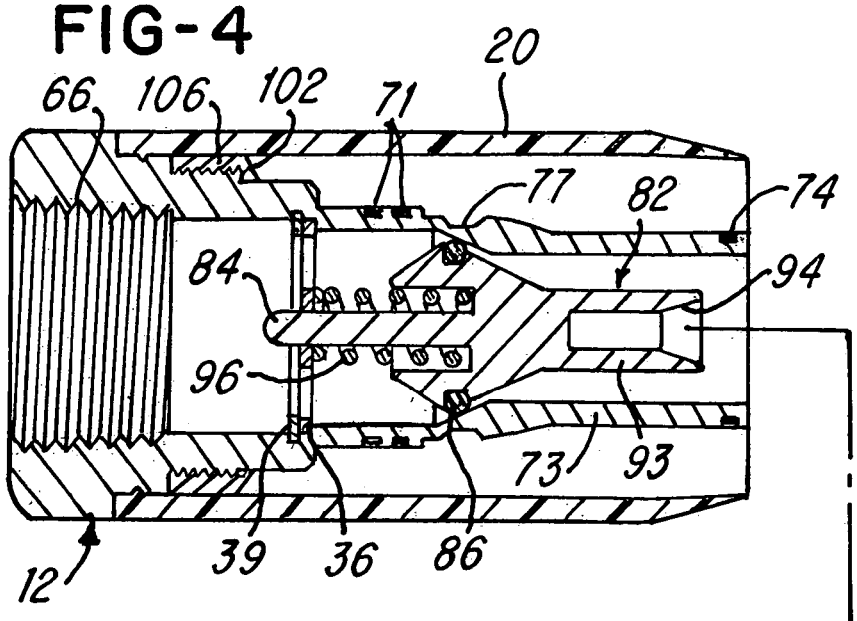
FIG-4
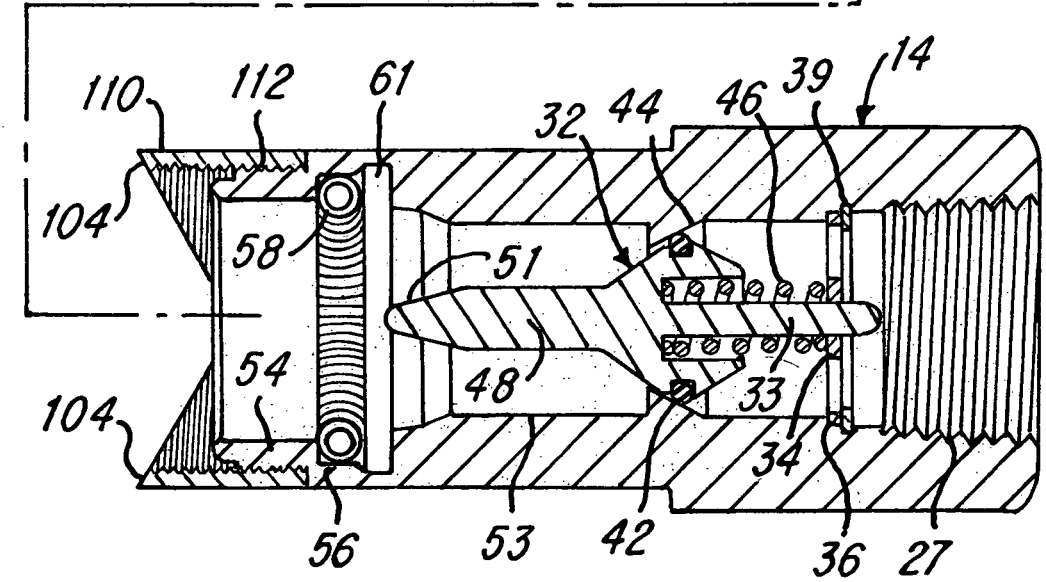
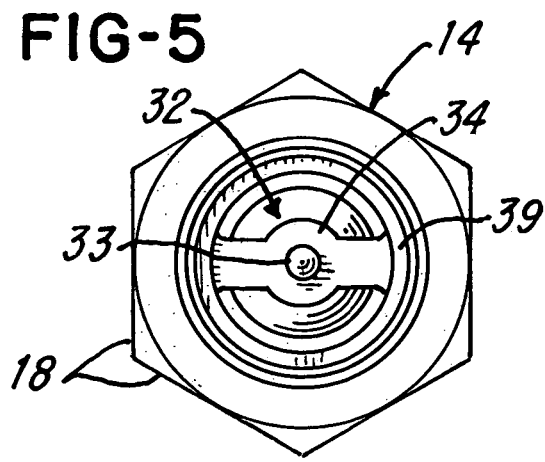
FIG-5

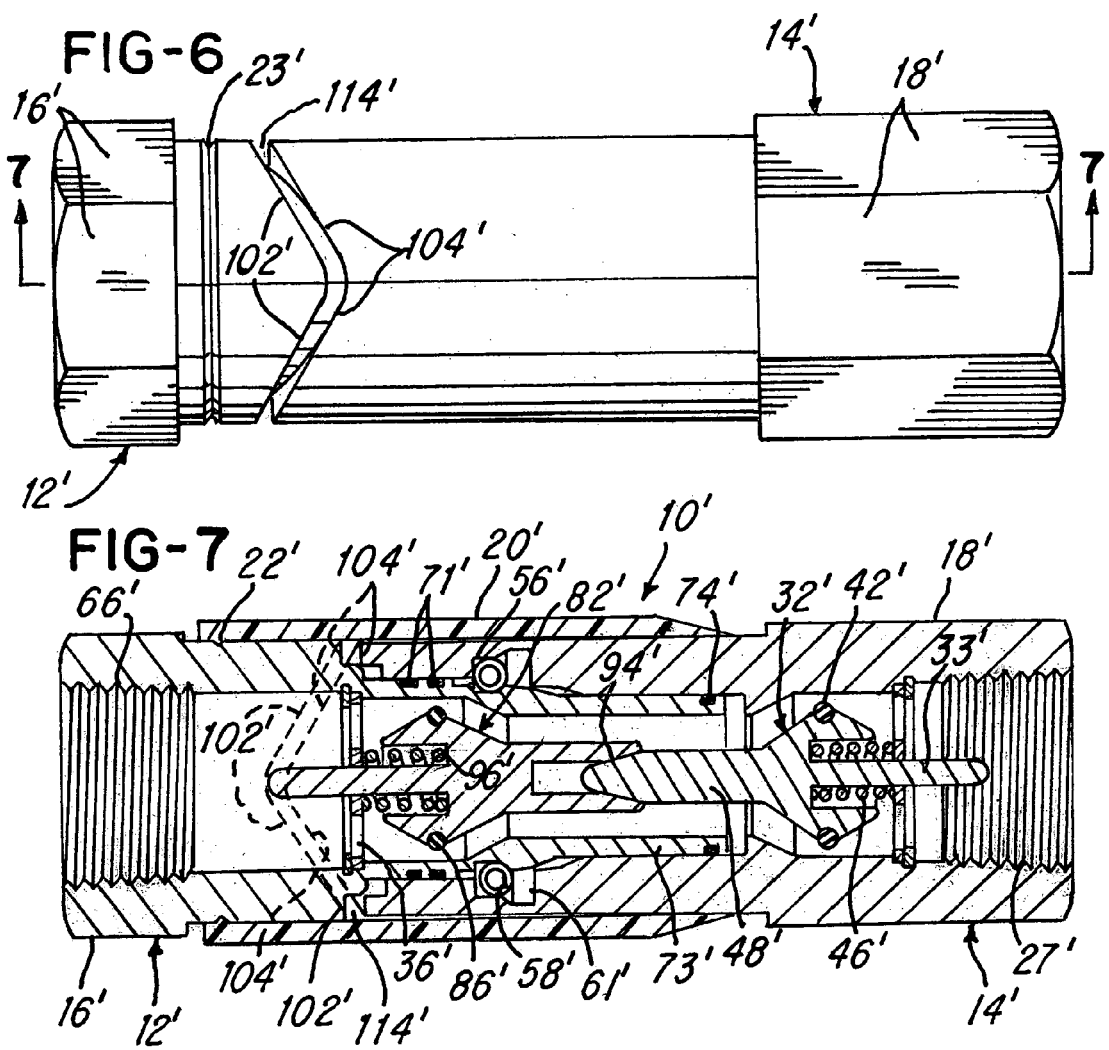

BREAKAWAY HOSE COUPLING WITH MANUAL ROTATIONAL SEPARATION

BACKGROUND OF THE INVENTION

The present invention relates to a breakaway hose coupling for a flexible fuel supply hose and of the general type disclosed in U.S. Pat. No. 5,433,247 which issued to the assignee of the present invention and the disclosure of which is herein incorporated by reference. The breakaway coupling may be for a coaxial hose as disclosed in the patent with a fuel supply passage and a vapor return passage both of which have axially moveable valve members for closing the passages in the event the coupling is separated. The present invention also relates to a breakaway coupling having a single fuel supply passage with axially moveable valve members for closing the fuel supply passage in the male and female coupling bodies in the event of separation of the coupling.

In a breakaway hose coupling having a single fuel supply passage or coaxial fuel supply and vapor return passages, the breakaway hose coupling protects the fuel dispensing equipment from forces which may damage the equipment when separation of the coupling occurs. For example, when a vehicle driver inadvertently forgets to remove the fuel dispensing nozzle from the fuel tank inlet tube and drives away, as disclosed in U.S. Pat. No. 4,691,941, the coupling separates when the hose receives an axial tension force, for example, between 300 to 350 pounds. Upon separation, internal valve members move to their closed positions to prevent the release of fuel from the coupling components and attached hoses.

It has been found desirable to provide for separating the breakaway coupling by the operator of the fueling station or by inspection personnel in order to perform periodic inspection and maintenance on the breakaway coupling to insure continued proper operation of the coupling. One form of manual separation of the breakaway hose coupling is disclosed in U.S. Pat. No. 6,182,695. This patent discloses the use of a cup-like tool having a lever actuated cam and which mounts on the coupling after one of the hoses has been removed by threadably engaging one of the coupling members. The tool applies an axial tension force to the coupling to produce separation of the coupling members. After the coupling is inspected and parts are replaced, if necessary, the tool is used for reassembling the coupling, after which the hose is reattached so that the use of the coupling may be continued.

SUMMARY OF THE INVENTION

The present invention is directed to an improved breakaway coupling for a flexible fuel supply hose and of the type described above. The breakaway coupling of the invention provides for conveniently and quickly separating the coupling without removing a hose from the coupling and with the use of conventional hand tools or wrenches. This separation of the coupling permits a person to perform regular or periodic inspection and maintenance of the breakaway coupling to assure proper and continued operation of the coupling including free movement of the internal valve members. The means for manual separation of the coupling components does not add substantial cost to the manufacture of the coupling nor does it add any significant weight or size to the coupling.

In accordance with embodiments of the invention, a tubular male and female components or valve bodies of a breakaway coupling are provided with axially opposing and peripherally extending cam surfaces. The cam surfaces are effective to exert a substantial axial separating force on the tubular coupling components or valve bodies in response to relative rotation of the valve bodies using conventional tools such as a pair of open end wrenches. The cam surfaces may be formed on integral parts of the valve bodies or may be formed on cylindrical sleeves or collars threadably connected to the valve bodies. Preferably, a resilient cylindrical sleeve is attached to the male valve body and surrounds the cam surfaces and junction of the valve bodies.

Other features and advantages of the invention will be apparent from the following description, the accompanying drawings and the appended claims.

BRIEF DESCRIPTION OF THE DRAWINGS

FIG. 1 is an elevational view of an assembled and connected breakaway coupling constructed in accordance with the invention;

FIG. 2 is an elevational view similar to FIG. 1 but with the protective cylindrical cover removed;

FIG. 3 is an axial section of the assembled and connected coupling components, taken generally on a line 3—3 of FIG. 1;

FIG. 4 is an axial section of the coupling components shown in FIGS. 1–3 and with the components disconnected;

FIG. 5 is an end view of the assembled coupling taken generally on the line 5—5 of FIG. 2;

FIG. 6 is an elevational view similar to FIG. 2 and showing a modification of a coupling constructed in accordance with the invention; and FIG. 7 is an axial section similar to FIG. 3 and taken generally on the line 7—7 of FIG. 6.

DESCRIPTION OF THE PREFERRED EMBODIMENTS

FIG. 1 illustrates a breakaway hose coupling 10 constructed in accordance with the invention and which includes a tubular male valve fitting or body 12 and a tubular female valve fitting or body 14 which are formed of a metal such as aluminum and have corresponding hexagonal outer end surfaces 16 and 18, respectively. As shown in FIGS. 1 and 3, the valve bodies 12 and 14 are shown in their coupled or connected position and are partially surrounded by a resilient and cylindrical sleeve or cover 20 which has an internal circumferential bead 22 which snap-fits into a mating external groove 23 within the valve body 16.

Referring to FIG. 3, the female valve body 14 defines an internal fuel supply passage 25 and has an end portion with internal threads 27 for receiving a fitting on the end of a short fuel supply hose (not shown) extending from a fuel pump or dispenser. A valve element or member 32 is supported for axial movement within the center of the passage 25 by a valve stem 33 slidably supported by a center cross portion 34 of a washer 36. (FIG. 5) secured within the valve body 14 by a retaining ring 39. The valve member 32 carries a resilient sealing ring 42 which is normally urged toward a tapered or frusto-conical surface or valve seat 44 by a compression spring 46. The valve member 32 has an axially projecting center pin 48 which has a tapered or conical end surface 51. The valve body 14 defines a cylindrical bore 53 and a cylindrical end portion 54 having external threads and defines an annular or cylindrical counterbore or cavity 56. The cavity 56 confines an annular latch spring 58, for example, in the form of a canted coil spring as disclosed in U.S. Pat. No. 4,655,462. The valve body 14 also defines a slightly larger diameter counterbore or cavity 61 is connected to the counterbore 56 by a tapered or frusto-conical surface 62.

The male valve body 12 has internal threads 66 for receiving a fitting on the end of a flexible fuel supply hose (not shown) which extends to a fuel dispensing nozzle (not shown). The valve body 12 includes a cylindrical intermediate portion 68 which seats within the end portion 54 of the valve body 14 and carries a pair of external resilient sealing rings 71 to form a fluid-tight seal with the end portion 54 of the valve body 14. The valve body 12 has a cylindrical inner end portion 73 which slides into the bore 53 and carries a resilient external sealing ring 74 to form a second fluid-tight seal between the valve bodies 12 and 14. An annular external seat 77 is formed on the valve body 12 and normally retains the latch spring 58. A tapered or frusto-conical surface 79 extends from the seat 77 to the cylindrical outer surface of the body end portion 73.

The valve body 12 also supports a valve element or member 82 which includes a guide stem 84 supported for sliding movement within the center hole of another circular washer 36 in the same manner as the guide stem 34 of the valve member 32 is supported for sliding movement. The washer 36 is retained by a spring retaining washer 39, and the valve member 82 carries a resilient sealing ring 86 which is adapted to seat on a tapered or frusto-conical surface 88 formed within the valve body 12. The valve member 82 also has a tubular inner end portion 93 with a tapered or frustoconical seat 94 which receives the tapered end surface 51 of the valve member 32. A compression spring 96 extends from the center portion of the washer 36 into a counterbore within the valve member 82 and cooperates with the compression spring 46 to center the valve members 32 and 82 in their open positions (FIG. 3) when the valve bodies 12 and 14 are coupled or connected together.

In accordance with the present invention, diametrically opposite cam surfaces 102 (FIGS. 2 and 3) are formed on the male valve body 12, and opposing and mating diametrically opposite cam surfaces 104 are formed on the female valve body 14. In the embodiment shown in FIGS. 2–4, the cam surfaces 102 are formed on the end of a tubular or cylindrical sleeve or collar 106 which is connected to the valve body 12 by mating threads 108 (FIG. 3). The cam surfaces 104 are formed on the end of a tubular or cylindrical sleeve or collar 110 which is rigidly connected to the valve body 14 by mating threads 112. Diametrically opposite V-shaped gaps 114 are defined between the cam surfaces 102 and 104 to provide for assembling the valve bodies 12 and 14.

When the valve bodies 12 and 14 are separated (FIG. 4), the latch spring 58 is rolled or shifted to the right (FIG. 3) until the spring 58 expands outwardly into the large annular cavity 61. The valve body 12 is then inserted into the valve body 14 until the cam surfaces 102 engage the cam surfaces 104. The valve bodies 12 and 14 are then pulled axially apart by the width of the gap 114 so that the latch spring 58 rolls inwardly due to pressure exerted by the annular surface 77 until the latch spring is confined within the annular recess 56, as shown in FIG. 3. In this position, the latch spring 58 secures the valve bodies 12 and 14 together in their normal connected and operating position. As mentioned above, a substantial axial tension force, such as 300 pounds to 350 pounds, is required to separate the valve bodies 12 and 14 back to the disconnected positions shown in FIG. 4.

When it is desired to separate the valve bodies 12 and 14 for inspection and/or replacement of internal parts or components, such as the springs and O-ring seals, a pair of wrenches, such as open end wrenches, are inserted onto the hex surfaces 16 and 18, and torque is applied so that the valve bodies 12 and 14 are rotated relative to each other. This causes the cam surfaces 102 and 104 to exert the necessary substantial axial tension force on the valve bodies so that the valve body 12 collapses the latch spring 58 radially until the valve bodies 12 and 14 are free to separate when the valve members 32 and 82 move to their closed positions, as shown in FIG. 4. As also shown in FIG. 4, when the valve bodies 12 and 14 separate, the protective resilient cover 20 remains with the male valve body 12 to provide protection for the tubular end portion 73 of the valve body 12.

A modification of the breakaway coupling is shown in FIGS. 6 and 7. In this embodiment, a breakaway coupling 10' has the same components as the breakaway coupling 10 described above in connection with FIGS. 1–5, and accordingly, the components are identified with the same reference numbers but with the addition of prime marks. The primary difference in the embodiment disclosed in FIGS. 6 and 7 is that the diametrically opposite cam surfaces 102' and the opposing diametrically opposite cam surfaces 104' are formed as integral parts of the corresponding valve bodies 12' and 14'. Preferably, the valve bodies 12' and 14' are machined from a metal such as aluminum using an automatic machining tool center. Thus, the integral cam surfaces 102' and 104' may be easily formed on the valve bodies by appropriate programming of the machining tool center.

From the drawings and the above description, it is apparent that a breakaway coupling constructed in accordance with the invention provides desirable features and advantages. As a primary advantage, the breakaway coupling of the invention may be conveniently and quickly inspected for regular or periodic maintenance and to insure proper operation of the internal valve members by simply rotating the valve bodies relative to each other with conventional hand tools or wrenches. In addition, the separation of the valve bodies may be performed without disconnecting any flexible hoses from the valve bodies. Also, the resilient tubular cover 20 or 20' protects the cam surfaces 102 and 104 or 102' and 104' and prevents dust and dirt from entering the gap 114 or 114'. As mentioned above, it is also apparent that the above opposing cam surfaces 102 and 104 or 102' and 104' may be formed on a coaxial breakaway coupling with a vapor return passage such as disclosed in above-mentioned U.S. Pat. No. 5,433,247. The separation means of the invention also eliminates the need for a specially formed tool as disclosed in above-mentioned U.S. Pat. No. 6,182,695.

While the forms of coupling herein described constitute preferred embodiments of the invention, it is to be understood that the invention is not limited to these precise forms of coupling, and that changes may be made therein without departing from the scope and spirit of the invention as defined in the appended claims.

What is claimed is:

1. A breakaway coupling adapted for use with a flexible fuel supply hose having a fuel supply passage, said coupling comprising a first tubular valve body and a second tubular valve body assembled together with a common center axis and defining a fuel supply passage, at least one axially movable valve member within each of said valve bodies and movable between an open position and a closed position relative to said passage, a connecting member releasably connecting said valve bodies and providing for movement of said valve bodies from a connected position to a disconnected position in response to a substantial axial tension force on said valve bodies, said valve bodies supporting cooperating surfaces effective to move said valve bodies from said connected position to said disconnected position in response to relative rotation of said surfaces, and said cooperating surfaces are connected to flat outer surfaces adapted to receive wrenches to produce relative rotation of said surfaces.

2. A coupling as defined in claim 1 wherein said surfaces comprise peripherally extending V-shaped cam surfaces on said valve bodies.

3. A coupling as defined in claim 2 wherein at least one of said cam surfaces is formed by an integral part of one of said valve bodies.

4. A coupling as defined in claim 2 wherein at least one of said surfaces is formed by an annular sleeve supported by one of said valve bodies.

5. A coupling as defined in claim 1 and including an annular protective sleeve surrounding both of said valve bodies in said connected position and covering said surfaces.

6. A coupling as defined in claim 5 wherein said sleeve comprises a resilient material and remains attached to one of said valve bodies when said valve bodies are moved to said disconnected position.

7. A coupling as defined in claim 1 wherein said connecting member comprises an annular coil spring.

8. A coupling as defined in claim 1 wherein said valve bodies define an axially extending vapor return passage concentric with said fuel supply passage.

9. A breakaway coupling adapted for use with a flexible fuel supply hose having a fuel supply passage, said coupling comprising a first tubular valve body and a second tubular valve body assembled together with a common center axis and defining a fuel supply passage, at least one axially movable valve member within each of said valve bodies and movable between an open position and a closed position relative to said passage, a connecting member releasably connecting said valve bodies and providing for movement of said valve bodies from a connected position to a disconnected position in response to a substantial axial tension force on said valve bodies, and said valve bodies having peripherally extending and opposing cam surfaces effective to move said valve bodies from said connected position to said disconnected position in response to relative rotation of said valve bodies.

10. A coupling as defined in claim 9 wherein said cam surfaces are integral with said valve bodies.

11. A coupling as defined in claim 9 wherein cam surfaces comprise end surfaces on annular sleeves rigidly connected to said valve bodies.

12. A coupling as defined in claim 10 and including an annular protective sleeve of resilient material and surrounding both of said valve bodies in said connected position and covering said cam surfaces.

13. A coupling as defined in claim 12 wherein said sleeve is attached to one of said valve bodies and remains with said one body when said valve bodies are moved to said disconnected position.

14. A coupling as defined in claim 9 wherein said connecting member comprises an annular coil spring.

15. A coupling as defined in claim 9 wherein said valve bodies have flat outer surfaces adapted to receive wrenches to produce said relative rotation of said valve bodies.

16. A coupling as defined in claim 9 wherein said valve bodies define an axially extending vapor return passage concentric with said fuel supply passage.

17. A breakaway coupling adapted for use with a flexible fuel supply hose having a fuel supply passage, said coupling comprising a first tubular valve body and a second tubular valve body assembled together with a common center axis and defining a fuel supply passage, at least one axially movable valve member within each of said valve bodies and movable between an open position and a closed position relative to said passage, an annular coil spring releasably connecting said valve bodies and providing for movement of said valve bodies from a connected position to a disconnected position in response to a substantial axial tension force on said valve bodies, and said valve bodies having peripherally extending V-shaped cam surfaces in opposing spaced relation and effective to move said valve bodies from said connected position to said disconnected position in response to relative rotation of said valve bodies.

18. A coupling as defined in claim 17 wherein said cam surfaces are integral with said valve bodies.

19. A coupling as defined in claim 9 wherein cam surfaces comprise end surfaces on cylindrical sleeves rigidly connected to said valve bodies.

* * * * *